United States Patent
Harrison et al.

(10) Patent No.: US 8,654,980 B2
(45) Date of Patent: Feb. 18, 2014

(54) QUANTUM KEY DISTRIBUTION METHOD AND APPARATUS

(75) Inventors: Keith Harrison, Monmouthshire (GB); William Munro, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/387,361

(22) PCT Filed: Jan. 28, 2011

(86) PCT No.: PCT/US2011/022893
§ 371 (c)(1),
(2), (4) Date: Apr. 2, 2012

(87) PCT Pub. No.: WO2011/094520
PCT Pub. Date: Aug. 4, 2011

(65) Prior Publication Data
US 2012/0177200 A1  Jul. 12, 2012

(51) Int. Cl.
*H04L 9/08* (2006.01)
(52) U.S. Cl.
USPC .......................................................... 380/278
(58) Field of Classification Search
USPC .................................................. 380/278, 263
See application file for complete search history.

(56) References Cited

U.S. PATENT DOCUMENTS

| | | | |
|---|---|---|---|
| 5,515,438 A | 5/1996 | Bennett et al. | |
| 5,768,378 A * | 6/1998 | Townsend et al. | 380/256 |
| 5,999,285 A | 12/1999 | Brandt et al. | |
| 6,895,091 B1 * | 5/2005 | Elliott et al. | 380/278 |
| 2002/0041687 A1 * | 4/2002 | Parks et al. | 380/263 |
| 2004/0078421 A1 * | 4/2004 | Routt | 709/201 |
| 2005/0078827 A1 | 4/2005 | Tajima et al. | |
| 2005/0135620 A1 * | 6/2005 | Kastella et al. | 380/256 |
| 2005/0190921 A1 | 9/2005 | Schlafer et al. | |
| 2009/0196419 A1 | 8/2009 | Tapster | |
| 2012/0250863 A1 * | 10/2012 | Bukshpun et al. | 380/278 |
| 2013/0101121 A1 * | 4/2013 | Nordholt et al. | 380/279 |

FOREIGN PATENT DOCUMENTS

GB  2427317  12/2006

OTHER PUBLICATIONS

L. Moli-Sanchez et al., "Performance Analysis of Quantum Cryptography Protocols in Optical Earth-Satellite and Intersatellite Links", Dec. 2009, IEEE Journal on Selected Areas in Communications, vol. 27, No. 9, pp. 1582-1590.*
Furst et al., "Free-space quantum key distribution over 144km", 2006, Proc. of SPIE vol. 6399, pp. 1-7.*
Scott et al., "A Location Based Encryption Technique and Some of Its Applications", Jan. 2003, ION NTM, pp. 734-740.*
International Search Report and Written Opinion received in PCT Application No, PCT/US2011/022893, mailed Sep. 30, 2011, pp. 9.

* cited by examiner

*Primary Examiner* — Matthew Smithers (57) ABSTRACT

A QKD transmission apparatus comprises a GPS receiver module operable to receive a GPS signal, and a processor operable to use the GPS signal to derive a clock signal for transmission of a QKD signal.

10 Claims, 4 Drawing Sheets

QUANTUM KEY DISTRIBUTION METHOD AND APPARATUS

BACKGROUND

Quantum key distribution (QKD) methods and systems have been developed which enable two parties to share random data in a way that has a very high probability of detecting any eavesdroppers. This means that if no eavesdroppers are detected, the parties can have a high degree of confidence that the shared random data is secret. QKD methods and systems are described, for example, in U.S. Pat. No. 5,515,438, U.S. Pat. No. 5,999,285 and GB 2427317 A.

Whatever particular QKD system is used. QKD methods typically involve QKD transmitting apparatus 10 (see FIG. 1 of the accompanying drawings) using a QKD transmitter 12 to send a random data set provided by random source 11, over a quantum signal channel 5 to a QKD receiver 22 of QKD receiving apparatus 20. The QKD transmitting and receiving apparatus 10, 20 then respectively process the data transmitted and received via the quantum signal channel in respective processing sub-systems 13, 23 thereby to derive a common subset m of the random data set. This processing is done with the aid of messages exchanged between the processing sub-systems 13, 23 via an insecure classical communication channel 6 established between classical channel transceivers 14 and 24 of the transmitting and receiving apparatus 10, 20 respectively. As the quantum signal channel 5 is a noisy channel, the processing of the data received over that channel includes an error correction phase that relies on messages exchanged over the classical channel 6.

In some QKD systems, the quantum signal is embodied as a stream of randomly polarized photons sent from the transmitting apparatus to the receiving apparatus either through a fiber-optic cable or free space; such systems typically operate according to the BB84 quantum coding scheme (see for example C. H. Bennett and G. Brassard "Quantum Cryptography: Public Key Distribution and Coin Tossing", Proceedings of IEEE International Conference on Computers Systems and Signal Processing, Bangalore, India, December 1984, pp 175-179).

Figure 1:
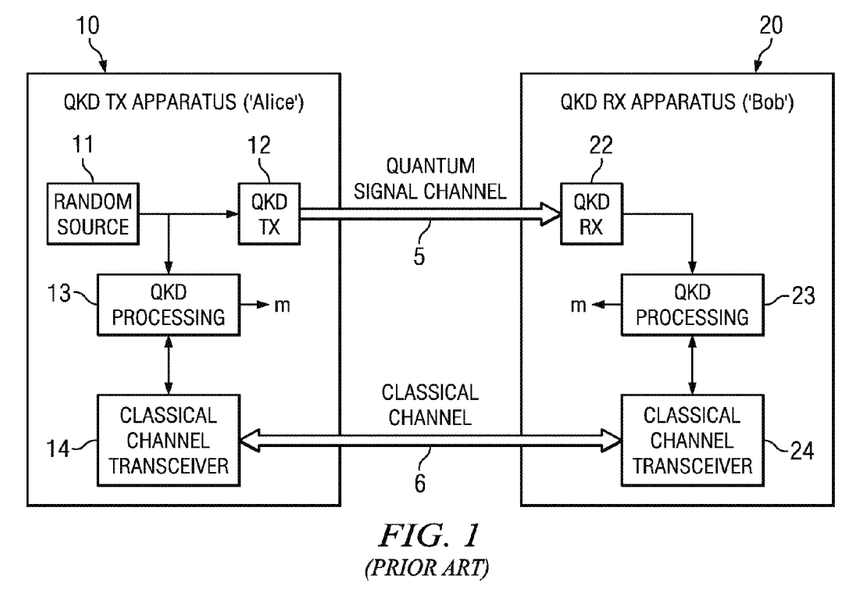
FIG. 1 is a functional block diagram of a known QKD system.

In such systems, the QKD transmitter 12 provides the optical components for selectively polarizing photons, and the QKD receiver 22 provides the optical components for receiving photons and detecting their polarization. Typically, these optical components establish two pairs of orthogonal polarization axes, the two pairs of polarization axes being offset by 45° relative to each other. Conventionally, these two pairs of polarization axes are referred to as vertical/horizontal and diagonal/anti-diagonal respectively. An example QKD transmitter 12 and QKD receiver 22 will now be described with reference to FIGS. 2 and 3 respectively of the accompanying drawings.

Figure 2:
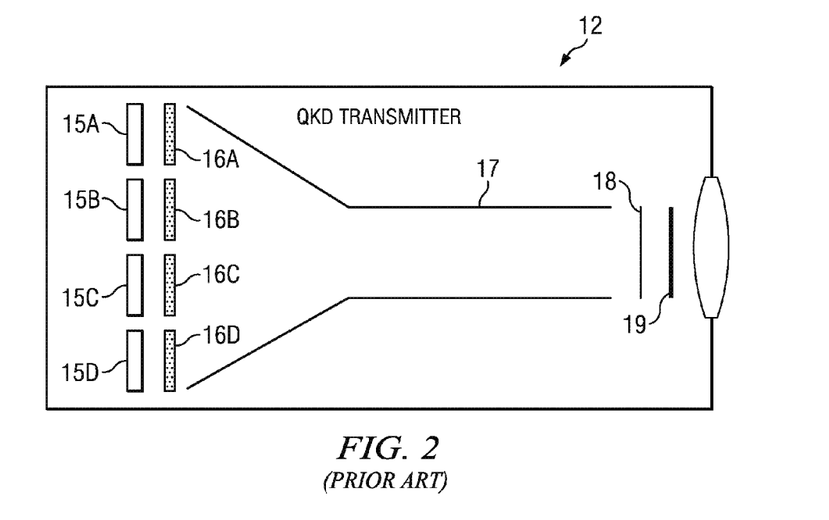
FIG. 2 is a functional block diagram of a QKD transmitter of the FIG. 1 system.

The QKD transmitter 12 of FIG. 2 comprises an array of light emitting diodes (LEDs) 15A-D in front of each of which is a respective polarizing filter 16A-16D. Filter 16A polarizes photons emitted from LED 15A vertically, filter 16B polarizes photons emitted from LED 15B horizontally, filter 16C polarizes photons emitted from LED 16C diagonally and filter 16D polarizes photons emitted from LED 16D anti-diagonally. Thus, each photon in the stream of photons coming away from the filters 16A-D, is polarized in one of four directions, these directions corresponding to two pairs of orthogonal polarization axes at 45° to each other. A fibre optic light guide 17 conveys the polarized photons out through a lens via a narrow band pass frequency filter 18 (for restricting the emitted photons to a narrow frequency range, typically plus or minus 1 nm), and a spatial filter 19 (for restricting the emitted photons to a narrow frequency range and for obfuscating the characteristics of the particular LED that fired). An attenuation arrangement, not specifically illustrated, is also provided is to reduce the number of photons emitted; the attenuation arrangement may simply be an attenuating filter placed near the other filters or may take the form of individual power control circuits for regulating the power fed to each LED 15A to 15D when pulsed. Without the attenuation arrangement the number of photons emitted each time a LED is pulsed at normal levels would, for example, be of the order of one million; with the attenuation arrangement in place, the average emission rate is 1 photon per 10 pulses. Importantly this means that more than one photon is rarely emitted per pulse.

Figure 3:
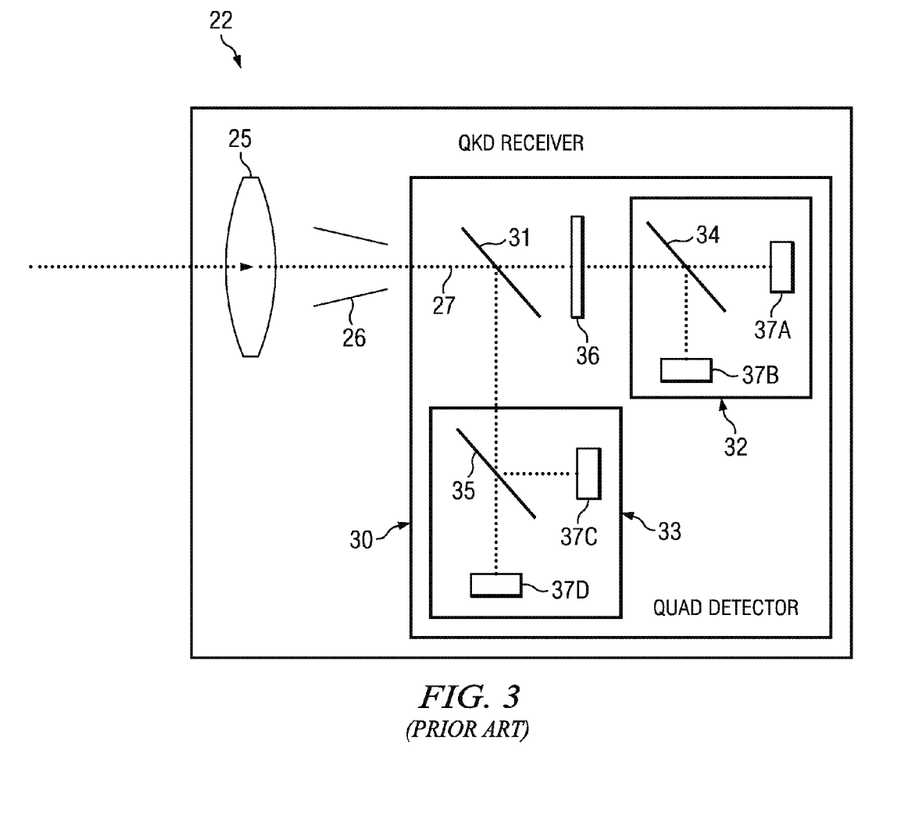
FIG. 3 is a functional block diagram of a QKD receiver of the FIG. 1 system.

The FIG. 3 QKD receiver 22 comprises a lens 25, a quad-detector arrangement 30, and a fibre optic light guide 26 for conveying photons received through the lens 25 to the quad-detector arrangement 30. The quad-detector arrangement 30 comprises a beam splitter 31, a half-wave plate 36 for rotating the polarization of photons by 45°, a first paired-detector unit 32, and a second paired-detector unit 33. The first paired-detector unit 32 comprises a polarization-dependent beam splitter 34 and detectors 37A, 37B; the presence of the beam splitter 34 causes the polarizations detected by the detectors 37A and 37B to be mutually orthogonal. The second paired-detector unit 33 comprises a polarization-dependent beam splitter 35 and detectors 37C, 37D; the presence of the beam splitter 35 causes the polarizations detected by the detectors 37C and 37D to be mutually orthogonal. The polarization rotation effected by half-wave plate 36 causes the polarizations detected by the detectors 37A, 37B to be at 45° to those detected by the detectors 37C, 37D; more specifically, the paired detector unit 33 is arranged to detect horizontal/vertical polarizations whereas the paired detector unit 33 is arranged to detect diagonal/anti-diagonal polarizations.

The beam splitter 31 is depicted in FIG. 3 as half-silvered mirror but can be of other forms such as diffraction gratings. The polarization-dependent beam splitters 34, 35 are, for example, birefringent beam splitters.

Operation of the apparatus of FIGS. 1 to 3 in accordance with the BB84 protocol is generally as follows with the QKD transmitting apparatus 10 and QKD receiving apparatus 20 being conventionally referred to as 'Alice' and 'Bob' respectively.

Alice randomly generates (using source 11) a multiplicity of pairs of bits, typically of the order of $10^8$ pairs. Each pair of bits consists of a data bit and a basis bit, the latter indicating the pair of polarization axes to be used for sending the data bit, be it vertical/horizontal or diagonal/anti-diagonal. A horizontally or diagonally polarized photon indicates a binary 1, while a vertically or anti-diagonally polarized photon indicates a binary 0. The data bit of each pair is thus sent by Alice over the quantum signal channel 5 encoded according to the pair of polarization directions indicated by the basis bit of the same pair. When receiving the quantum signal from Alice. Bob randomly chooses, by virtue of the action of the half-silvered mirror 31, which paired-detector unit 32, 33 and thus which basis (pair of polarization directions) it will use to detect the quantum signal during each time slot and records the results. The sending of the data bits of the randomly-generated pairs of bits is the only communication that need occur using the quantum channel 5.

Next, Bob sends Alice, via the classical channel 6, partial reception data comprising the time slots in which a signal was received, and the basis (i.e. pair of polarization directions) thereof, but not the data bit values determined as received.

Alice then determines a subset m of its transmitted data as the data bit values transmitted for the time slots for which Bob received the quantum signal and used the correct basis for determining the received bit value. Alice also sends Bob, via the classical channel 6, information identifying the time slots holding the data bit values of m. Bob then determines the data bit values making up the received data. The next phase of operation is error correction of the received data by an error correction process involving messages passed over the classical channel 6; after error correction, Bob's received data should match the data m held by Alice and this can be confirmed by exchanging checksums over the classical channel 6.

Accordingly, the QKD system transmits information by the use of polarized photons or by phase encoding photons. Alice creates a stream of encoded photons and Bob has to detect them. It is usual for these photons to be emitted at a fixed time interval. For example every 100 ns, a photon is emitted by Alice. Bob knows this fact and can therefore make measurements at the appropriate time. A synchronised clock between Alice and Bob can be provided by way of a clock signal sent from Alice to Bob, which can be in the form of a regular light pulse (carrying no information) for example. Such a pulse can be sent at regular intervals, thus enabling Bob to maintain synchronisation with Alice, and determine a rate at which bits are transmitted.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first item could be termed a second item, and, similarly, a second item could be termed a first item, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 4:
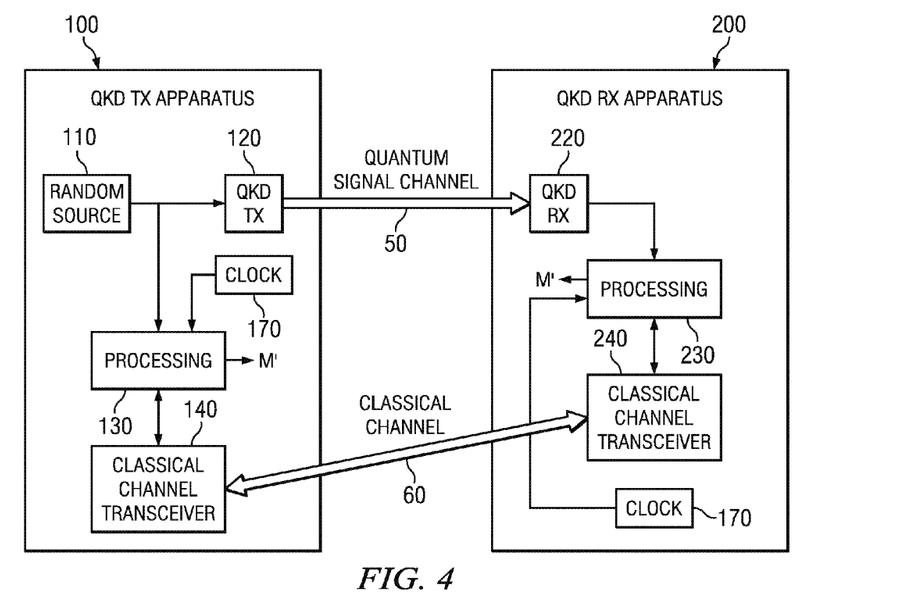
FIG. 4 is a functional block diagram of a QKD system according to an embodiment.

FIG. 4 is a schematic representation of a QKD system according to an embodiment. QKD transmission (100) and reception apparatus (200) comprise clock modules 170 operable to provide a global clock signal for use in apparatus 100, 200. The clock signals from modules 170 provide respective clock pulses which tick at the same rate and at the same time. According to an embodiment, such synchronized clocks are made available using GPS (global positioning system). More specifically, both the transmission apparatus 100 and reception apparatus 200 comprise GPS receiver modules operable to receive a GPS signal—the receiver modules (not specifically shown in FIG. 4) can be integrated within the clock modules 170, or provided separately, and will generally comprise an integrated antenna, although it will be appreciated that other alternatives are possible, such as for example the provision of an external (to the respective apparatus) GPS module and/or external antenna. GPS satellites continually transmit messages which include data in the form of a GPS signal comprising:

i) the time the message was sent;
ii) precise orbital information of the satellite in question (ephemeris data);
iii) the general system health and rough orbits of all GPS satellites (the almanac data).

Therefore, amongst other payload data, a GPS signal comprises accurate timing data which can be used to synchronise a transmission and reception scheme for a system according to an embodiment.

More specifically, a GPS receiver module uses accurate timing information in order to (amongst other things) determine its position relative to the satellite constellation. This constellation generally consists of 24 satellites each orbiting the earth in 12 hour time periods, such that any user has always a line of sight to 5-10 satellites. Each satellite transmits a continuous pseudorandom noise (PN) sequence with a chip rate of 1023 KHz, and a repetition period of 1023 chips. Each satellite has its own particular PRN sequence, which has good correlation properties and is orthogonal to the PRN sequences of the other satellites.

More specifically, each transmitted GPS signal is a direct sequence spread spectrum signal. The signal available for commercial use is that associated with Standard Positioning Service and utilizes a direct sequence bi-phase spreading signal with a 1.023 MHz spread rate placed upon a carrier at 1575.42 MHz (the so-called L1 frequency). Each satellite transmits a unique pseudo-random noise code (also referred to as the 'Gold' code) which identifies the particular satellite, and allows signals simultaneously transmitted from several satellites to be simultaneously received by a receiver, with little interference from one another. As described, the pseudo-random noise (PN) code sequence length is 1023 chips, corresponding to a 1 millisecond time period. One cycle of 1023 chips is called a PN frame. Thus, each received GPS signal in C/A (coarse acquisition) mode is constructed from the high rate 1023 kHz repetitive PN pattern of 1023 chips. At very low received signal levels, the pseudo random pattern may still be tracked, or otherwise used, to provide ambiguous system timing by processing many PN frames (e.g., 1000 repetitions over 1 second).

Superimposed on the PN sequence is a satellite data message. The data message includes positioning data (the almanac and ephemeris), clock timing data and time of week (TOW) data. A GPS processor of a receiver module locks onto a specific visible satellite signal using known correlation techniques often performed by a correlator, to correlate between the received signals and a known replica of the transmitted signal from the satellite. After lock has been achieved, positioning and time data (ephemeris and TOW) can be demodulated from the carrier signal. The correlation and data extraction sequence described above can be repeated for other satellite codes if desired in order to obtain, for example, the earth position of the receiver in 3 dimensions.

The provision of using the time signal from one or more GPS satellites is a one-way time transfer. That is to say, one end (the satellite(s)) transmits its current time over a communication channel to one or more receivers. The receivers decode the message and report the time. Accordingly, a time value received from one or more GPS satellites can be used in transmission apparatus 100 and receiving apparatus 200. It will be appreciated that, for each GPS signal received, the time value encoded in that signal will represent the time that the signal was transmitted by the satellite. This time does not need to be corrected upon reception, or be used to adjust a local clock. Providing both receiving and transmission apparatus receive the same signal, any difference between the encoded time value and 'real time' will not impact the system's ability to use the times to synchronize. Furthermore, since the transmitter and receiver are located relatively near to one another (such as within 1 km for example), it is very unlikely that they will receive signals from different satellites (thereby providing different times), although, even in this remote case, the rate of the received clock signals will be the same, and so provision can be made to compensate for a difference in 'base' time in the apparatus (such as by using the ephemeris and almanac data to decode which satellite signal is being used by respective parts of the system for example).

In order to provide a secure system in which a GPS signal is not spoofed, an offset to a derived clock signal from a GPS signal can be used. More specifically, according to an embodiment, a clock signal derived from a GPS signal—that is to say, a clock signal derived from the regular carrier frequency of a GPS signal—can be shifted by a predefined amount known only to the QKD transmission and reception apparatus. The shift can be of the order of 1-2 ns for example, although it will be appreciated that other values can be used. The derived clock signal can be shifted by the time shift value using processor 130, 230 in order to provide a modified clock signal for the system.

According to an embodiment, an initial time shift value, which can be used to bootstrap the system, can be agreed upon (before a QKD session is initiated) in a secure environment for example. The time shift value can then be changed periodically as required (although this is not necessary), such as after each session for example, or after a predetermined period of time. A new time shift value can be derived from the shared secret from a previous session for example. This has the advantage that no information needs to be sent between sub-systems because both Alice and Bob have the same value. Further, it will be appreciated that this process cannot be influenced by Alice or Bob.

Alternatively, a time shift value can be chosen by Alice and sent to Bob. There are several ways this can be achieved. For example, the chosen value can be xor'ed with a one-time pad secret taken from the shared secret data generated in the previous session. The result is transmitted to Bob who can xor this data with the same one-time pad secret to reveal the value chosen by Alice. Alternatively, a time shift value chosen by Alice can be encrypted using an encryption scheme such as AES for example, which scheme uses data from the shared secret to perform the encryption. The corresponding encrypted value can be decrypted by Bob using the same one-time pad data to reveal the chosen value for a session. Other alternatives for providing a shared time shift value are possible as will be appreciated by those skilled in the art.

Figure 5:
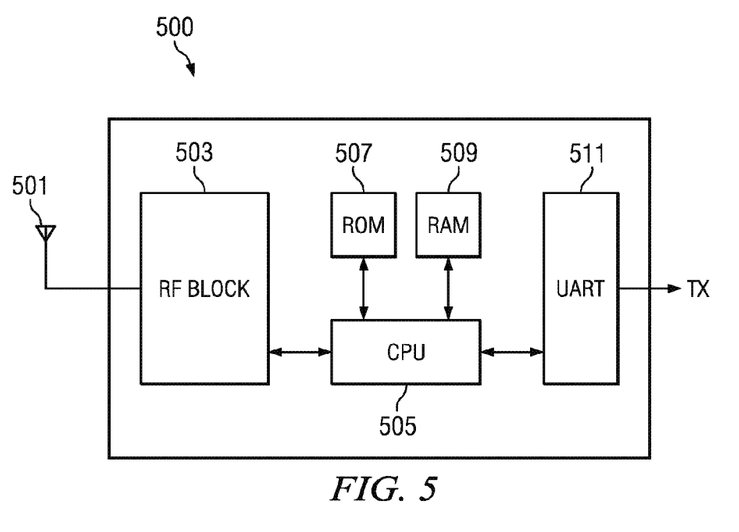
FIG. 5 is a functional block diagram of a GPS receiver.

FIG. 5 is a functional block diagram of a GPS receiver module 500 operable for use in an embodiment. GPS receiver 500 typically includes the following: an antenna 501 for receiving one or more GPS signals from a GPS transmitter; an RF block 503 for receiving the GPS data and converting it to digital data; a CPU 505 for processing the data; ROM 507 to store any necessary firmware for processing the data; RAM 509 used by the CPU for data processing; and a universal asynchronous receiver/transmitter module (UART) 511 for example to transmit data, such as to processor 130, 230 in the system of FIG. 4. Receiver module 500 can be integral to dock module 170, or can be separate and functionally linked thereto. Other alternatives are possible as will be appreciated by those skilled in the art.

The provision of an accurate (but modified/shifted) clock signal which is shared between the transmission and reception apparatus of the system i.e. global, allows the transmission and reception timings between sub-systems to be synchronised—that is to say, not only can timings be synchronised, but the start point can also be synchronised in order to ensure that there is no significant 'drift' between the timing schedules of the transmitter and receiver. Accordingly, in order for the receiver 220 to 'know' when to open the detectors in order to take a measurement according to the timing schedule, there has to be a base time that both the transmission system and the reception system know beforehand.

According to an embodiment, a simple handshake protocol between the transmission and reception portions of the system can be used in order to provide a reference (base) time that is used as the point from which all measurements for timings can be taken. For example, the receiving system 200 can send a message to the transmission system 100 using classical channel 60 which indicates that it is operable to begin reception of a quantum signal over quantum channel 50. Upon reception, transmission apparatus 100 can signal apparatus 100 that transmission will begin at a given time, such as 2 seconds from the time the transmission is sent for example.

Figure 6:
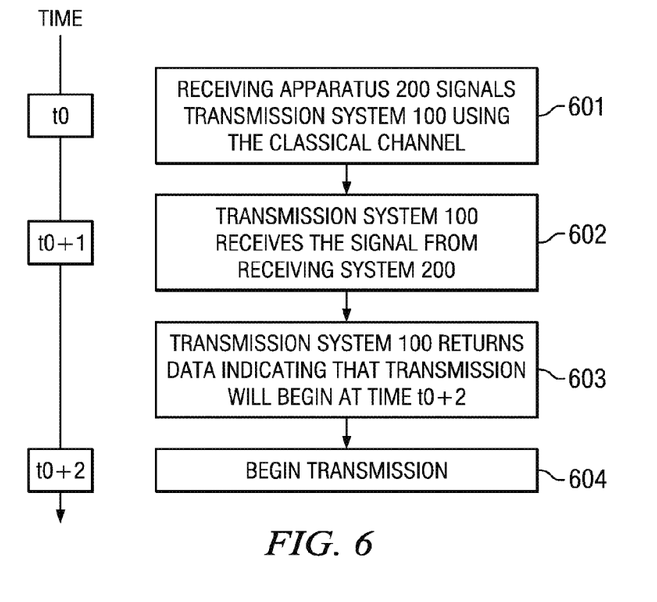
FIG. 6 is a flow chart depicting a handshake protocol according to an embodiment.

In this connection, FIG. 6 is a flow chart depicting a handshake protocol according to an embodiment. At step 601 receiving apparatus 200 signals transmission system 100 using the classical channel. The data sent at step 601 is sufficient to indicate that the receiving system 200 is prepared to accept an incoming quantum signal via receiver 220. This occurs at time t0.

At step 602, corresponding to time t0+1, transmission system 100 receives the signal from receiving system 200, and returns data (step 603) at time t0+1 indicating that transmission will begin at time t0+2. No further communication under the handshake is necessary, and transmission can begin at t0+2 (step 604). The timings given above are arbitrary, and not intended to be limiting. It will be appreciated by those skilled in the art that all that is required is a basic protocol between sub-systems of the apparatus which alerts the transmission apparatus to the fact that the receiving apparatus is primed and ready to receive a signal (over the quantum channel at least), and which provides the receiving apparatus with a time at which transmission will begin so that the receiving apparatus has an initial time from which to calibrate the opening of detection windows for measurements to be taken. Accordingly, in the example given with reference to FIG. 6, time t0+2 will be the time stamp from which timings for the transmission system 100 and receiving system 200 are determined. Accordingly t0+2 can correspond base time plus 2 time units, whatever they may be according to a desired level of granularity for time taking into account the chip rate of the GPS signal.

According to an embodiment, a QKD transmission system such as described with reference to FIG. 4 can further comprise crystal oscillator (XO) clocks, such as quartz clocks for example, at both receiver and transmitter ends. A received GPS signal can be used to correct any drift in a clock signal derived from the XO clocks in the conventional manner which will be familiar to those skilled in the art. If a correction in the clock signal from the XO clock exceeds a predefined amount, it may be possible that the GPS signal is being spoofed. Accordingly, any correction of a XO clock in excess of a predefined value can provide an indication that either there is a malfunction, or that an eavesdropper is trying to shift the time using a fake GPS signal in order to try to take control of the system. In either case, a session can be aborted. Furthermore, it will be noted that a clock signal from the XO clock can be used if a GPS signal is lost by the system, i.e. if a GPS receiver is unable to maintain a lock.

Following reception of bits at receiver 220 as described above, either with reference to a scheme in which bits are sent with irregular period, or according to a scheme in which bits are interposed with noise to form a signal which can be a signal of regular or irregular period, a random subset of measurements are destructively selected at receiving apparatus 200, such as 10% for example, and the times and the values (both data and basis) are transmitted over the classical channel to apparatus 100. The subset is compared with a reference list and an estimate of the error rate is thereby computed at the transmission apparatus—if too many of the received values that were measured in the correct basis are wrong, then the session can be aborted. For example, if it is determined that more than 5% of the values are wrong, the session can be scrapped—other alternatives are clearly feasible.

Measurement times and basis values (but not data values) for all received measurements are sent to the transmission apparatus 100 so that it can be determined which values are present and correct at receiver 200—all other measurements are disregarded. Note that no information about the data value is being transmitted by the receiver 200.

According to an embodiment, and as touched upon above, rather than transmitting real time for the measurements, the legitimate photon number can be transmitted, i.e. the 3'rd photon was transmitted at 10.07 ns, the 4'th photon was transmitted at 13.44 ns, the 5'th photon was transmitted at 17.93 ns and so on for example. The system can convert 3'rd to mean 10.07 ns, but an eavesdropper cannot. Referring to measurement 3 for example does not tell the eavesdropper when that transmission took place.

Error correction can now be performed. According to an embodiment, a Cascade-like algorithm or a randomized LDPC (low density parity check) algorithm can be used. A suitable LDPC scheme for performing error correction is described in, for example. Applicant's co-pending UK Patent Application with Publication No. 2455283, the contents of which are incorporated herein by reference in their entirety. A suitable Cascade scheme for performing error correction is described in, for example, G. Brassard and L. Salvail. Secret-key reconciliation by public discussion. Eurocrypt, pages 410-423, 1993, the contents of which are incorporated herein by reference in their entirety.

Once the error correction has been performed, privacy amplification can be performed. This is designed to eliminate any information that an eavesdropper might have gained. It is assumed that an eavesdropper cannot distinguish correct photons from the background noise, and that an eavesdropper does not know the basis used to encode the information. Note that a list of transmission intervals is generated by both the transmission and the reception apparatus.

Accordingly, during a QKD session, the transmission apparatus 100 and reception apparatus 200 end up with a shared random secret (after the error correction scheme). It is possible that an eavesdropper can determine some information about this shared secret. This might be because some photons were sent as multi-photons (which can be—and were—captured), or it might be because Cascade is used during which transmission and reception apparatus share parity information over the classical channel (which an eavesdropper can intercept). Other alternatives are possible as will be appreciated. According to an embodiment, the operational parameters of the run can be measured, and a theoretical upper limit to the amount of information that an eavesdropper could have obtained can therefore be computed. Having computed this, that number of bits from the shared secret are deleted. In order to delete information, a hash operation is performed on the shared secret by the system that reduces it in size by the amount that an eavesdropper has potentially obtained. This process is known as Privacy Amplification. Theoretically, a 2-universal hash function can be used. However, in practice and according to an embodiment, a scheme such as MGF1 (P1363 standard) is acceptable.

Although the above has been described primarily with reference to the provision of generating a shared secret using polarised photons, it will be appreciated by those skilled in the art that alternative schemes can be employed. For example, the system as described herein can easily be modified so that phase modulation can be used instead of polarisation modulation. Furthermore, it will be recognised by those skilled in the art that communications between sub-systems of the apparatus can be employed in various ways, such as through free space, or using optical fibres for example—the choice will be dependent on the type of modulation required, and the nature of the system desired. The above is not therefore intended to be limiting—that is to say, it is to be understood that the above-referenced arrangements are illustrative of the application of the principles disclosed herein. It will be apparent to those of ordinary skill in the art that numerous modifications can be made without departing from the principles and concepts of this disclosure, as set forth in the claims below.

What is claimed is:

1. A QKD transmission apparatus comprising:
a GPS receiver module operable to receive a GPS signal; and
a processor operable to use a time value encoded in the GPS signal to derive a clock signal for transmission of a QKD signal, wherein the derived clock signal is shifted by the processor by a predetermined time value in order to provide a modified clock signal.

2. A QKD transmission apparatus as claimed in claim 1, further comprising a crystal oscillator (XO) clock operable to provide an XO clock signal, where the XO clock signal is maintained by the clock signal derived from the GPS signal.

3. A QKD receiving apparatus operable to receive the QKD signal from the transmission apparatus of claim 1, wherein the GPS signal is a first GPS signal, the time value is a first time value, and the clock signal is a first clock signal, the QKD receiving apparatus comprising:
a GPS receiver operable to receive the a second GPS signal; and
a processor operable to use a second time value encoded in the second GPS signal to derive a second clock signal for reception of the QKD signal.

4. The QKD receiving apparatus of claim 3, wherein when first GPS signal and the second GPS signal are a same GPS signal, the second clock signal is equal to the first clock signal.

5. A QKD transmission system comprising a transmission apparatus and a reception apparatus, each comprising a GPS receiver operable to receive a first GPS signal and a second GPS signal, respectively, and each comprising a processor operable to derive a first clock signal from the first GPS signal and the second clock signal, respectively, for use in the system for respectively transmitting a QKD signal and receiving the QKD signal, where the first clock signal and the second clock signal are shifted using the processors by a predetermined time value in order to provide a modified first clock signal and a modified second clock signal for the system.

6. A QKD transmission method comprising:
providing a global, synchronised clock signal for a QKD system;
shifting the clock signal by a predetermined time value in order to provide a modified clock signal for the system; and
using the modified clock signal to transmit a quantum signal for the system.

7. The method as claimed in claim 6, further comprising using the modified clock signal to maintain a clock pulse from at least one local crystal oscillator clock of the system.

8. The method as claimed in claim 6, wherein the clock signal is derived from a GPS signal received by the system.

9. The method as claimed in claim 6, wherein the quantum signal has a regular or irregular period.

10. A QKD receiving apparatus operable to receive the QKD signal from a QKD transmission apparatus comprising:
a GPS receiver module operable to receive a GPS signal; and
a processor operable to use a time value encoded in the GPS signal to derive a clock signal for transmission of a QKD signal, wherein the GPS signal is a first GPS signal, the time value is a first time value, and the clock signal is a first clock signal, the QKD receiving apparatus comprising:
a GPS receiver operable to receive the a second GPS signal; and
a processor operable to use a second time value encoded in the second GPS signal to derive a second clock signal for reception of the QKD signal and, wherein when the first GPS signal is received from a first GPS satellite and the second GPS signal is received from a second GPS satellite different from the first GPS satellite, the receiving apparatus compensates for a difference between the second clock signal and the first clock signal using at least one of an ephemeris and almanac data of at least one of the first GPS signal and the second GPS signal.

* * * * *

UNITED STATES PATENT AND TRADEMARK OFFICE
CERTIFICATE OF CORRECTION

PATENT NO. : 8,654,980 B2
APPLICATION NO. : 13/387361
DATED : February 18, 2014
INVENTOR(S) : Keith Harrison et al.

Page 1 of 1

It is certified that error appears in the above-identified patent and that said Letters Patent is hereby corrected as shown below:

In the Claims

In column 9, line 8, in Claim 3, delete "the a" and insert -- a --, therefor.

In column 10, line 20, in Claim 10, delete "the a" and insert -- a --, therefor.

Signed and Sealed this
Fifth Day of August, 2014

Michelle K. Lee
*Deputy Director of the United States Patent and Trademark Office*